United States Patent
Yasohara et al.

(10) Patent No.: US 6,710,559 B2
(45) Date of Patent: Mar. 23, 2004

(54) MOTOR DRIVING DEVICE FOR MOTOR HAVING MULTI-PHASE COILS

(75) Inventors: Masahiro Yasohara, Hyogo (JP); Toshiki Tsubouchi, Osaka (JP); Kenji Sugiura, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 13 days.

(21) Appl. No.: 10/153,323

(22) Filed: May 22, 2002

(65) Prior Publication Data
US 2002/0190674 A1 Dec. 19, 2002

(30) Foreign Application Priority Data
May 28, 2001 (JP) ........................................ 2001-158750

(51) Int. Cl.[7] ................................................ H02P 3/08
(52) U.S. Cl. ........................ 318/254; 318/138; 318/439; 318/432; 318/434; 318/599; 318/811; 318/685
(58) Field of Search ................................ 318/254, 138, 318/439, 811, 599, 430, 431, 432, 433, 434, 685, 696

(56) References Cited

U.S. PATENT DOCUMENTS

| | | | | |
|---|---|---|---|---|
| 4,832,576 A | * | 5/1989 | Deguchi et al. | 417/45 |
| 5,300,866 A | * | 4/1994 | Yasohara et al. | 318/254 |
| 5,729,067 A | * | 3/1998 | Janutka | 310/135 |
| 5,821,722 A | * | 10/1998 | Forbes et al. | 318/696 |

FOREIGN PATENT DOCUMENTS

JP        2000-308383        11/2000

* cited by examiner

Primary Examiner—Rina I. Duda
(74) Attorney, Agent, or Firm—RatnerPrestia (57) ABSTRACT

A motor driving device includes (a) a wide-angle feeding device for feeding power to three-phase coils in a width of 150 degrees in electrical angles and (b) a feeding amount controller for controlling a feeding amount to the coils. During overlapping periods, in which adjacent coils out of the three coils are in the same fed condition, an amount of a first value is fed to the coils and an amount of a second value is fed during the periods other than the overlapping periods. This structure allows the motor to reduce torque ripples, vibrations as well as noises during its operation, and at the same time, the motor can produce a greater output and operate at higher efficiency.

7 Claims, 11 Drawing Sheets

MOTOR DRIVING DEVICE FOR MOTOR HAVING MULTI-PHASE COILS

TECHNICAL FIELD

The present invention relates to a motor driving device suitable for driving a brushless DC motor, which is employed in e.g., an air-conditioner, air cleaner, hot water supply, and information apparatus such as a copy machine, printer, optical medium apparatus, and hard disc apparatus. It also relates to a motor driving device suitable for driving an induction motor and a reluctance motor and the like. More particularly, it relates to a motor driving device that can substantially reduce torque ripples, vibrations and noises of the motor in operation. The present invention also provides an apparatus including the same motor driving device.

BACKGROUND ART

Figure 9:
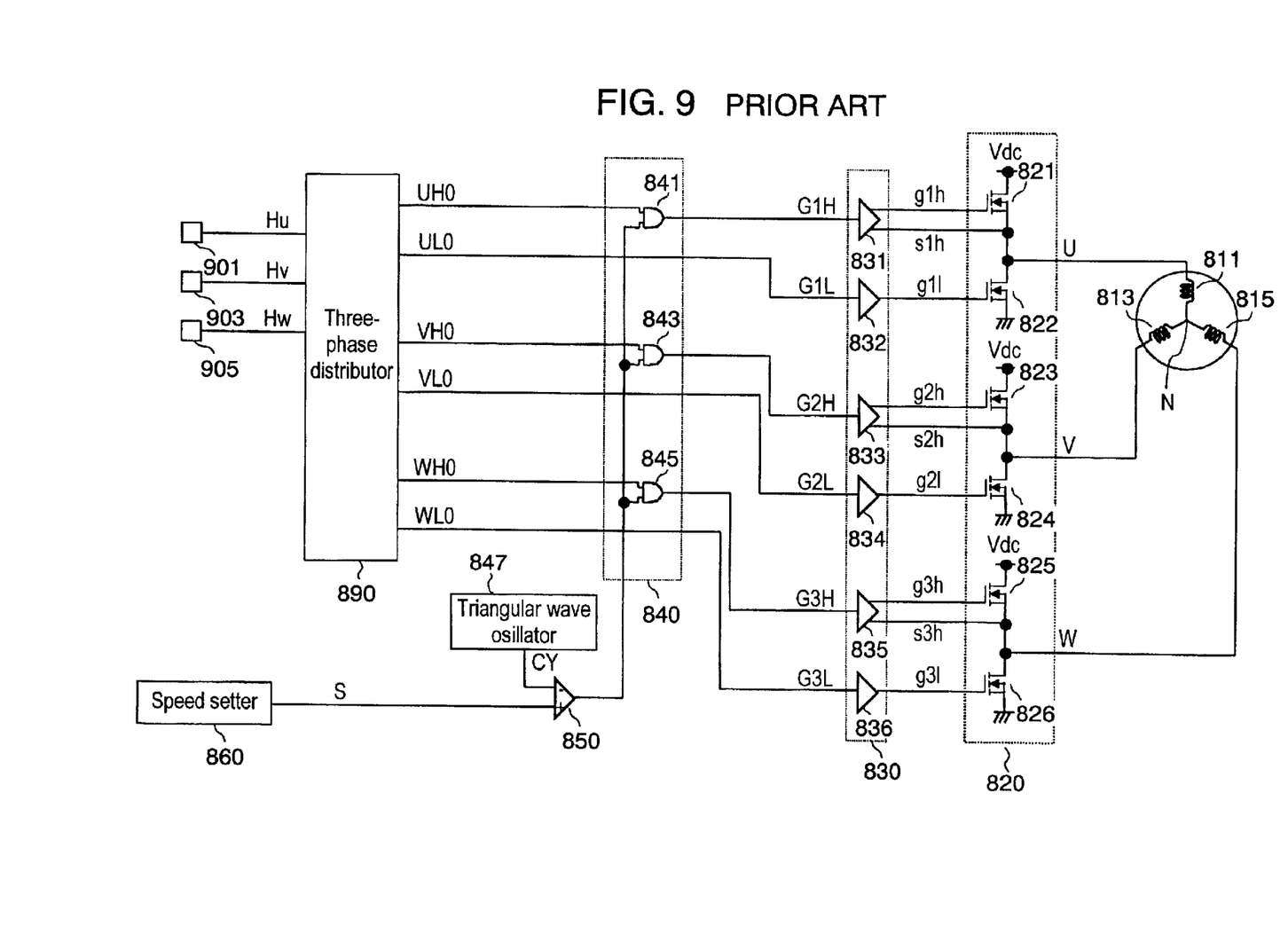
FIG. 9 is a circuit diagram of a conventional motor driving device.
Figure 10:
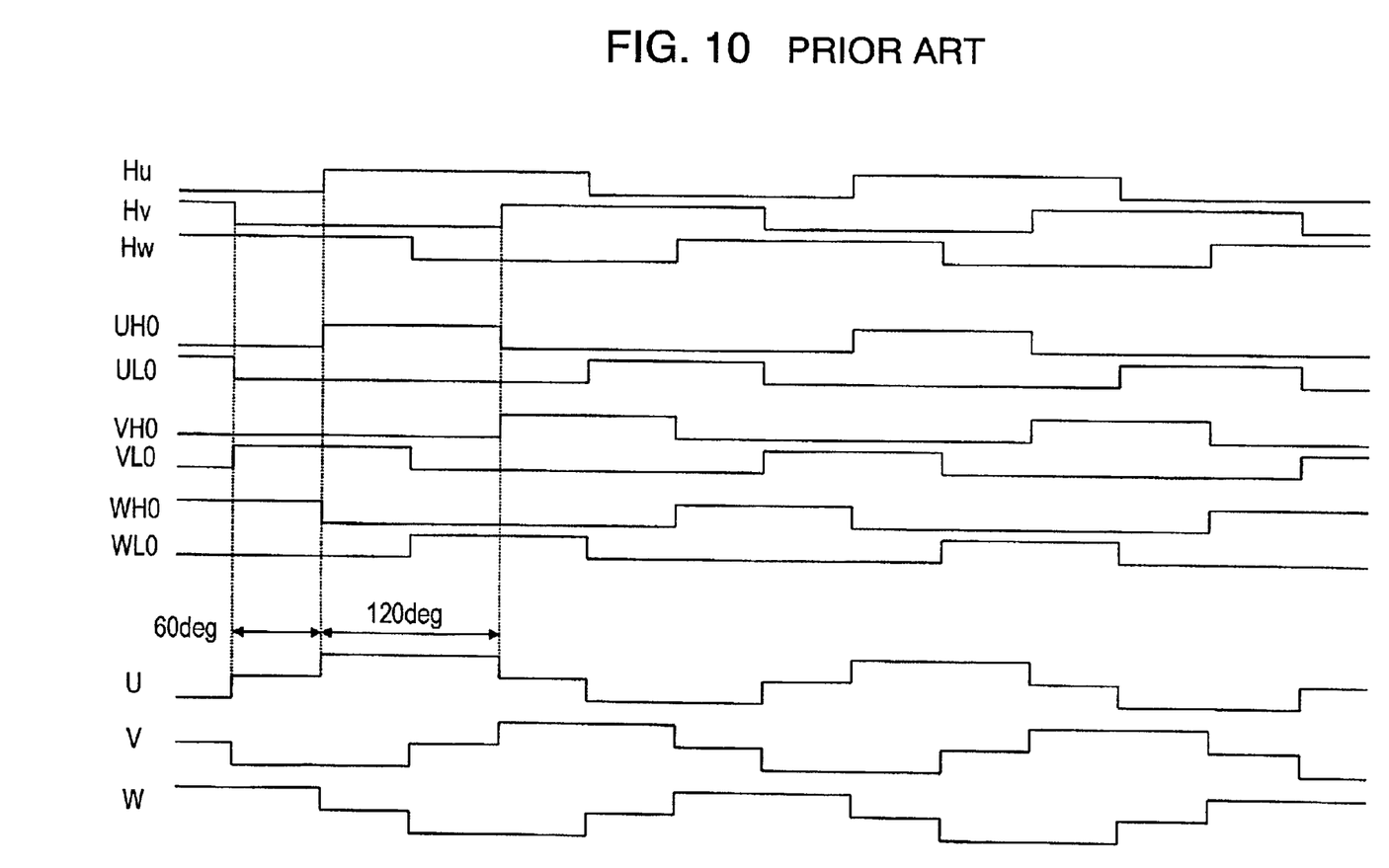
FIG. 10 depicts an operation of the motor driving device shown in FIG. 9.

A brushless DC motor is widely used as a driving motor of an air conditioner and an information apparatus because of its advantages such as a long service life, high reliability, and simplicity of speed control. FIG. 9 is a circuit diagram of a conventional motor driving device, and FIG. 10 shows signal waveforms at respective sections of the circuit shown in FIG. 9 with respect to motor rotating angles (electrical angle).

Figure 11:
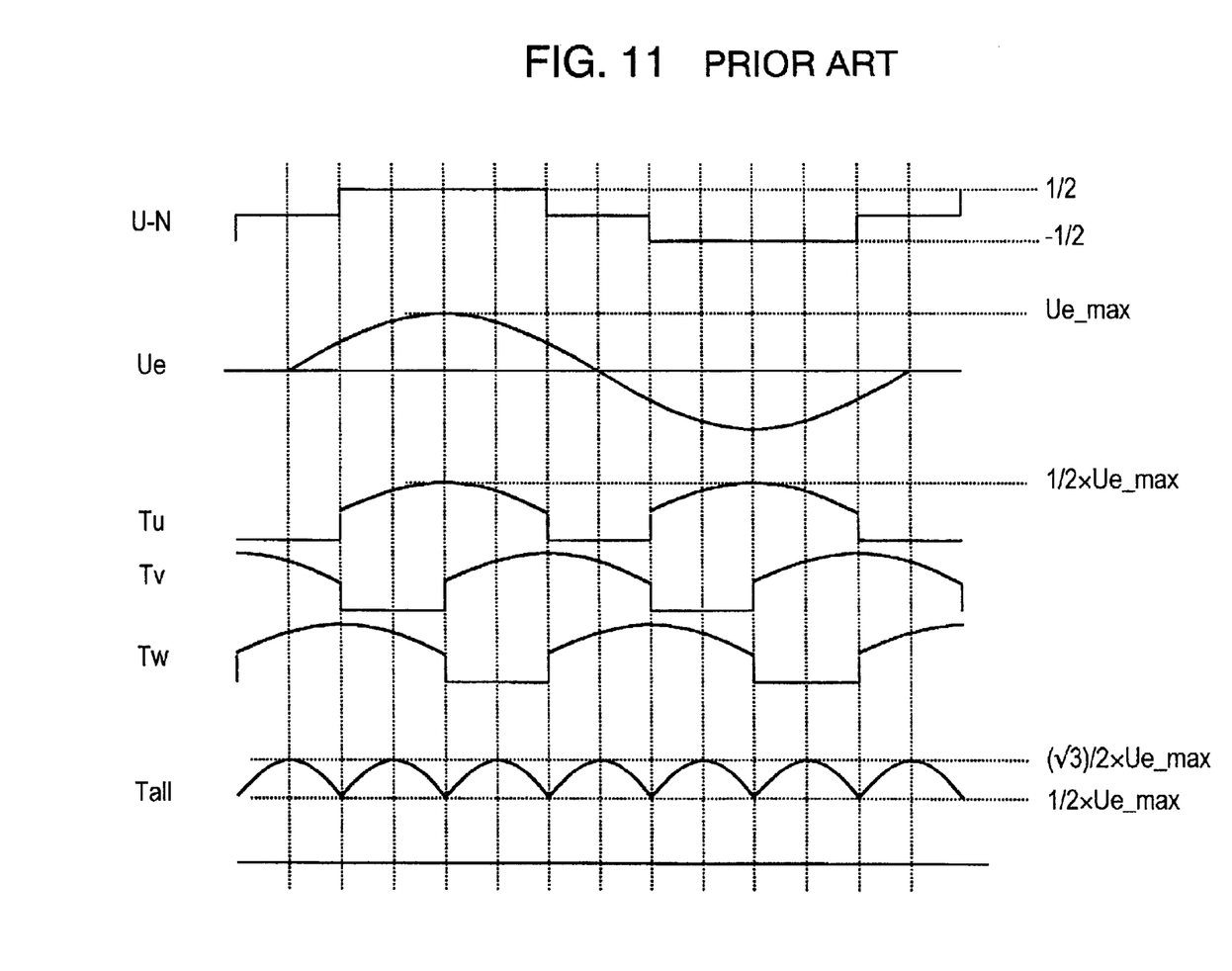
FIG. 11 illustrates how torque is produced in the motor driving device shown in FIG. 9.

As shown in FIG. 9, a driving device for the brushless DC motor (hereinafter referred to as simply "a motor"), in general, detects a rotor position with a plurality of position detectors 901, 903 and 905 which are formed of Hall elements. Three-phase distributor 890 receives position signals Hu, Hv and Hw from the position detectors, and outputs three-phase distributing signals UH0, UL0, VH0, VL0, WH0 and WL0. These signals are modulated by pulse width modulator (PWM) 840 into signals having a pulse width responsive to set-signal S prepared by speed setter 860. Gate driver 830 controls six switches, forming power feeder 820, to switch on or off sequentially based on output signals from modulator 840 and output signals from three-phase distributor 890. Power feeding to three-phase coils 811, 813 and 815 disposed to a stator is thus sequentially switched responsive to a rotor position, such as signals U, V, W shown in FIG. 10, thereby rotating the motor. FIG. 11 shows torque generated in the motor.

The torque shown in FIG. 11 is described hereinafter. If we direct our attention to phase-U coil 811, differential signal U-N between signal U and neutral point signal N is applied to coil 811. Signal U-N is a rectangular wave signal as shown in FIG. 11. When back electromotive force of phase-U coil 811 shapes in a sine wave such as signal Ue, the torque due to coil 811 is roughly proportional to the product of signal U-N multiplied by signal Ue, and the torque becomes what is shown by torque Tu in FIG. 11. In the same manner, the torque due to phase-V coil 813 and phase-W coil 815 become what are shown by torque Tv and Tw. Torque generated in the entire motor is thus torque "Tall" that is the sum of the torque of respective phases.

Torque "Tall" has a certain size of ripple as shown in FIG. 11. This torque ripple causes vibrations while the motor is driven, and the vibrations can resonate with the apparatus in which the motor is mounted, thereby producing noises. The vibrations also prevent the apparatus from being finely controlled, which blocks the performance of the entire apparatus from improving.

SUMMARY OF THE INVENTION

The present invention addresses the problem discussed above and aims to provide a simply structured motor driving device that can restrain torque ripples, vibrations and noises generated while a motor is driven. This motor driving device can also drive an object with higher power and in a higher efficient manner.

The motor driving device of the present invention comprises the following elements:

a motor having three-phase driving coils;

a wide-angle feeding device for feeding power to respective phase-coils in a width of 150° electric angle; and a controller for controlling an amount of power to be fed to the respective phase-coils by the wide-angle feeding device.

The wide-angle feeding device can detect overlapping periods in which adjacent two coils out of three coils stay in the same fed condition. The controller controls an amount of power to be fed during the overlapping periods as a first amount and another amount of power to be fed during the other periods than the overlapping periods as a second amount.

This structure discussed above allows the motor driving device of the present invention to reduce substantially the torque ripples, vibrations and noises of the motor in operation.

DETAILED DESCRIPTION OF PREFERRED EMBODIMENTS

Exemplary embodiments of the present invention are demonstrated hereinafter with reference to the accompanying drawings.

First Exemplary Embodiment

Figure 1:
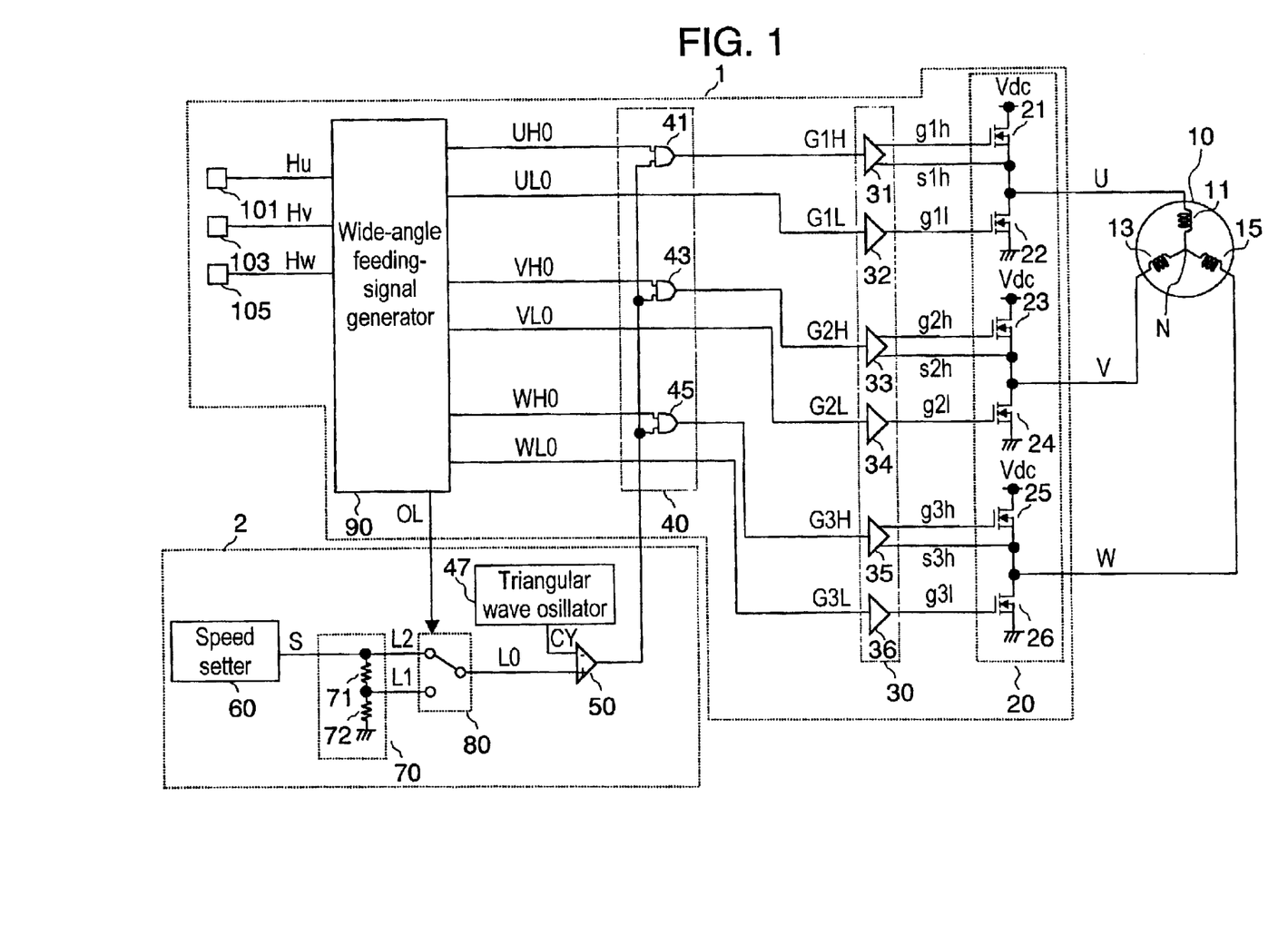
FIG. 1 is a circuit diagram of a motor driving device in accordance with a first exemplary embodiment of the present invention.

In FIG. 1, three-phase driving coils, namely, phase-U coil 11, phase-V coil 13 and phase-W coil 15, are connected to feeder 20 in the following manner. Feeder 20 forms an upper arm with three field-effect transistors (FET) 21, 23 and 25, and forms a lower arm with FET 22, 24 and 26. A first terminal of phase-U coil 11 is connected to a junction of FETs 21 and 22. A first terminal of phase-V coil 13 is connected to a junction of FETs 23 and 24. A first terminal of phase-W coil 15 is connected to a junction of FETs 25 and 26. Respective second terminals of the three-phase coils are connected to each other, thereby forming neutral point N.

A dc power supply (not shown) applies its output voltage Vdc to feeder 20 and powers the three-phase coils via feeder 20.

Figure 2:
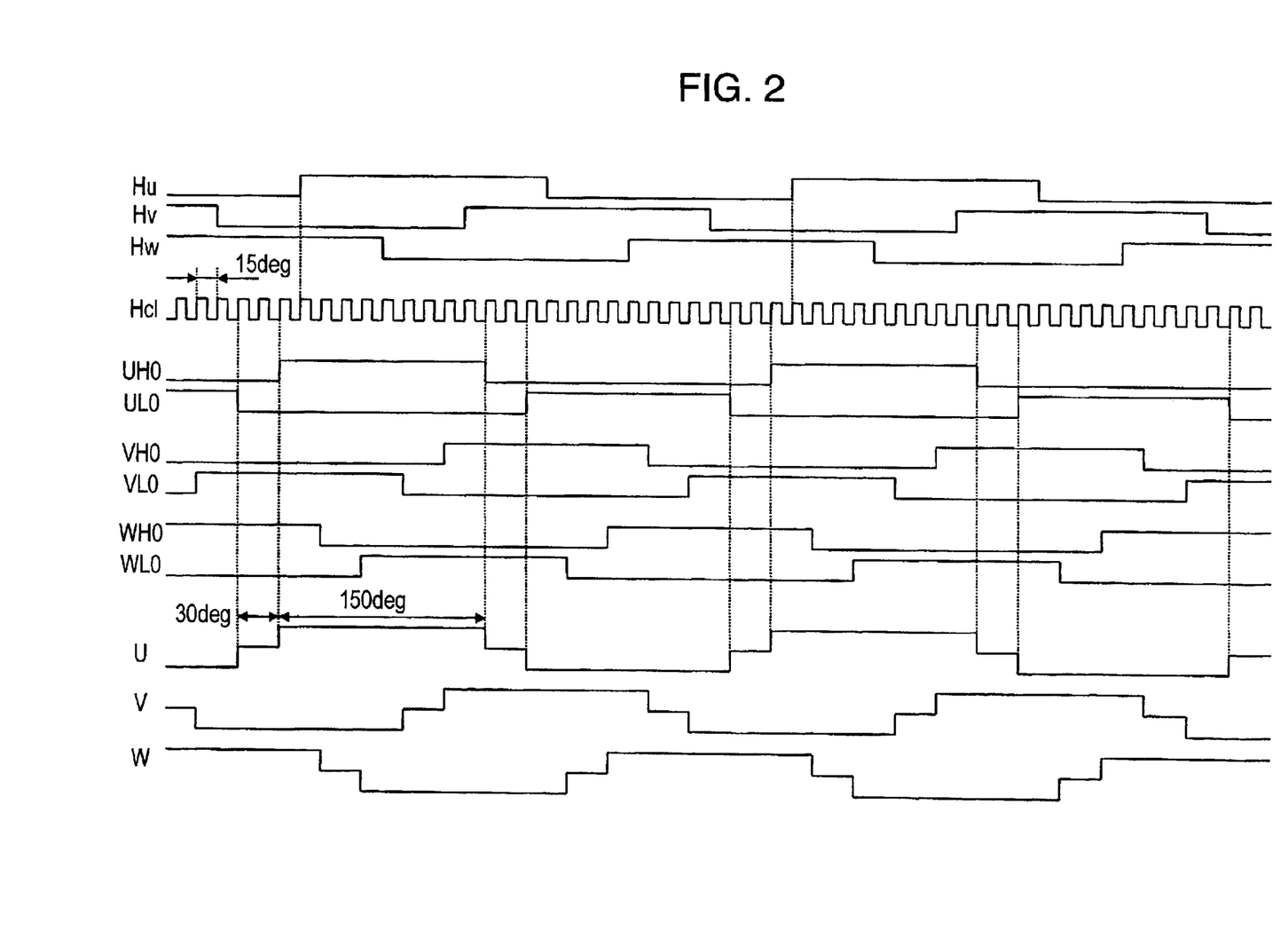
FIG. 2 depicts an operation of a wide-angle feeding-signal generator disposed in the motor driving device shown in FIG. 1.

Position detectors 101, 103 and 105 are formed of Hall elements or Hall ICs, and detect a position of a mover with respect to each phase coil 11, 13 and 15. (The mover is not shown. It is an element of a linear type motor and corresponds to a rotor of a rotating motor, hereinafter "rotor" is used instead of "mover".) Wide-angle feeding-signal generator 90 receives position detecting signals Hu, Hv and Hw from detectors 101, 103 and 105, and outputs signals UH0, UL0, VH0, VL0, WH0 and WL0. As shown in FIG. 2, these signals stay on level "H" during electric angle being kept at 150 degrees. When these signals stay on level "H", transistors 21, 22, 23, 24, 25 and 26, constituting feeder 20, are turned ON, and on the contrary, when these signals stay on level "L", those transistors are turned OFF. Signals UH0 and UL0 share a period of level "L", where an electric angle is kept at 30 degrees, with each other. They are in a supplemental relation to level "H" at electrical angle 150 degrees. Signals VH0 and VL0, signals WH0 and WL0 are in the same relation as signals UH0 and ULO. Further, signals UH0, VH0 and WH0 have a phase difference of 120 degrees in electrical angles with each other. Signals UL0, VL0 and WL0 also have a phase difference of 120 degrees with each other.

Pulse width modulator (PWM) 40 has AND gates 41, 43 and 45. Respective first input terminals of these gates receive signals UH0, VH0 and WH0. Respective second input terminals of these gates are commonly connected with each other and also coupled to an output of comparator 50, which compares signal L0 in voltages with triangular wave signal CY supplied from triangular wave oscillator 47. Signal L0 is supplied based on speed instruction signal S supplied from speed setter 60. Meanwhile triangular wave signal CY is a carrier signal in the pulse width modulation, and its frequency ranges from several kHz to several hundreds kHz, which is rather higher range than that of signal S or signal L0.

Signal L0 is obtained by selector 80 through selecting one of first value L1 or second value L2, both values being produced based on signal S supplied from speed setter 60. This selection is determined by overlapping period detecting signal OL supplied from wide-angle feeding-signal generator 90.

First value L1 is obtained by level setter 70, comprising resistors 71 and 72, through dividing a voltage. Second value L2 is obtained directly from signal S. The values of resistors 71 and 72 are set such that a ratio of L1 vs. L2 is to be sin ($\pi/3$): 1 (approx. 0.866: 1).

Gate driver 30 has buffers 31, 32, 33, 34, 35 and 36. Buffers 31, 33 and 35 receive output signals G1H, G2H and G3H from gates 41, 43 and 45 respectively. Buffers 32, 34 and 36 receive signals UL0, VL0 and WL0 from wide-angle feeding-signal generator 90 respectively. Each buffer outputs a signal to respective gates of transistors 21, 22, 23, 24, 25 and 26.

Elements 20, 30, 40, 90, 101, 103 and 105 discussed above constitute wide-angle feeding device 1. Elements 47, 50, 60, 70 and 80 discussed above constitute feeding amount controller 2.

An operation of the motor driving device in accordance with the first embodiment is demonstrated with reference to FIG. 2 through FIG. 6. FIG. 2 illustrates an operation of wide-angle feeding-signal generator 90. As shown in FIG. 2, generator 90 outputs signals UH0, UL0, VH0, VL0, WH0 and WL0, which stay on level "H" while an electrical angle is kept at 150 degrees. These signals are produced based on position detecting signals Hu, Hv and Hw supplied from respective position detectors 101, 103 and 105.

In general, signals Hu, Hv and Hw have a phase difference in 120 degrees electrical angle from each other. Therefore, if these signals are theoretically compounded, it is impossible to generate signals which stay on level "H" while an electrical angle is kept at 150 degrees. However, measure one cycle of at least one of signals Hu, Hv and Hw (e.g. signal Hu), then divide the one cycle at intervals of every 15 degrees in electrical angles. If signal Hu undergoes these processes, signal Hcl provided with such an electrical interpolation can be produced. Then signal Hcl is utilized to produce signals UH0, UL0, VH0, VL0, WH0 and WL0 which stay on level H while an electrical angle is kept at 150 degrees. FIG. 2 shows timing charts of this operation.

Not to mention, all the signals of Hu, Hv and Hw can be utilized and compounded, so that a composite signal having a higher frequency is obtained. One cycle of this signal can be used. However, when mechanical accuracy, whichever absolute or relative accuracy is, of mounting detectors 101, 103 and 105 is taken into consideration, it is more practical to use one signal out of three signals. One cycle is not always divided at intervals of every 15 degrees in electrical angles, it can be divided at smaller intervals. In this first embodiment, signal Hu is provided with electrical interpolation of division at intervals of every 15 degrees, so that signal Hcl is produced and then used.

When motor 10 is driven by signals UH0, UL0, VH0, VL0, WH0 and WL0 produced according to the timing charts shown in FIG. 2, terminals U, V and W of respective phase-coils are fed with power in the following condition: (a) 120 degrees phase difference in electrical angles with each other; (b) a cycle of feeding (applying a voltage) for 150 degrees and pause for 30 degrees.

Figure 3:
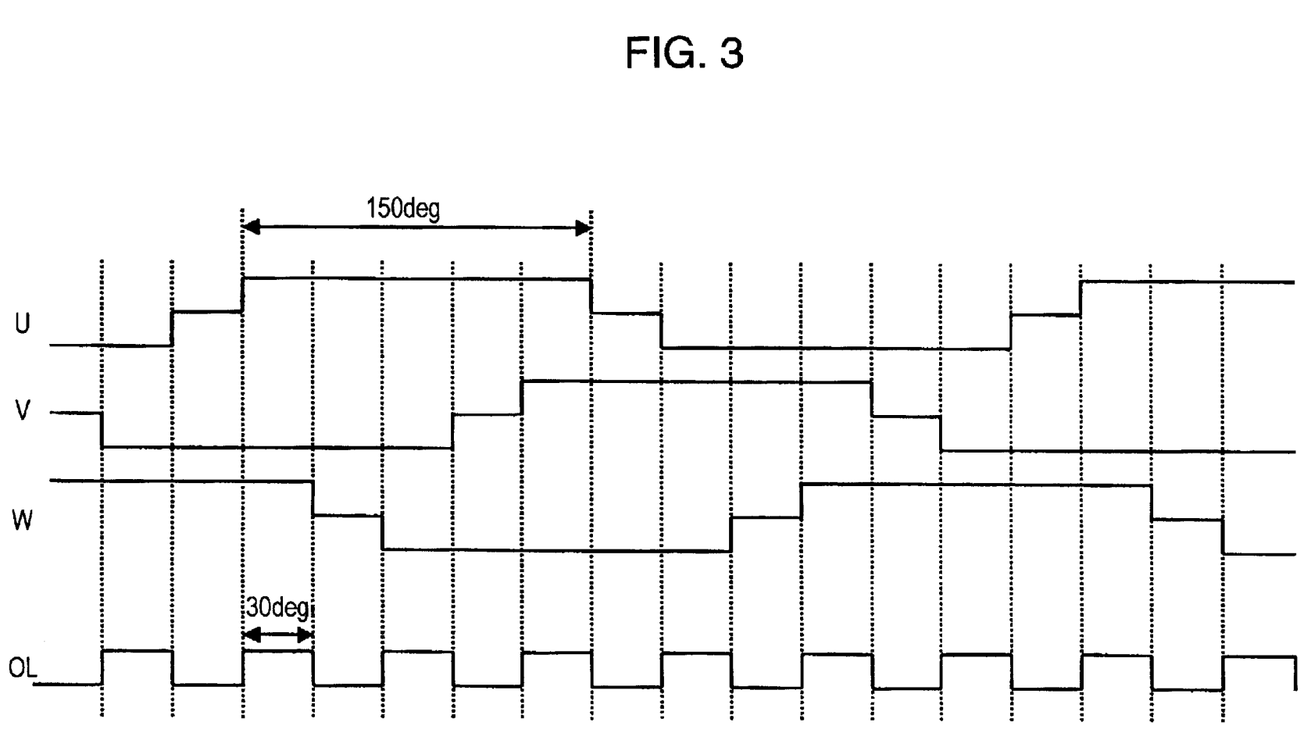
FIG. 3 illustrates how an overlapping period detecting signal OL is output in the motor driving device shown in FIG. 1.

When such feeding is provided, overlapping periods, in which adjacent two phase-coils are in the same fed condition (both the adjacent phase-coils are fed in the positive feeding direction or in the negative feeding direction), are sequentially produced while an electrical angle is kept at 30 degrees at intervals of 30 degrees phase-difference. As shown in FIG. 3, overlapping period detecting signal OL stays on level "H" during these overlapping periods.

In this first embodiment, while signal OL stays on level H, level setter 70 and selector 80 works so that signal S supplied from speed setter 60 is multiplied by sin ($\pi/3$) (approx. 0.866) and becomes first value L1, which is treated as signal L0. Thereby PWM modulation is operated based on value L1. Signal OL stays on level L during the periods other than the overlapping periods. During signal OL staying on level L, second value L2, which is signal S per se, is treated as signal L0. Thereby PWM modulation is operated based on value L2.

Figure 4:
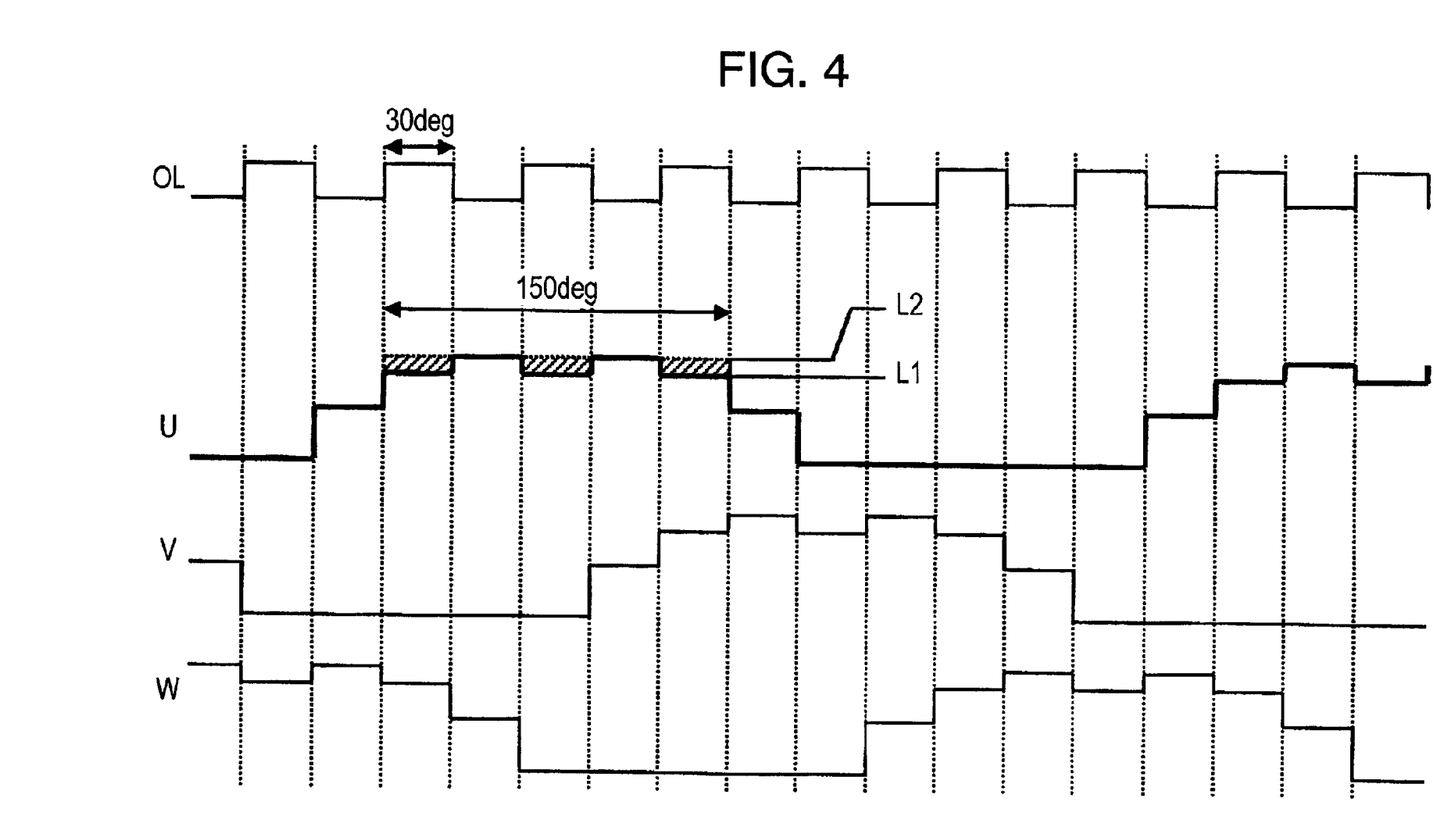
FIG. 4 shows feeding waveforms to the terminals of respective phase-coils of the motor driving device shown in FIG. 1.

As a result, feeding to each terminal U, V and W of respective phase-coils of motor 10 draws waveforms as shown in FIG. 4. During the overlapping periods, a little bit less power (sin ($\pi/3$), approx. 0.866) is fed than during non-overlapping periods in a 150-degree feeding period.

Figure 5:
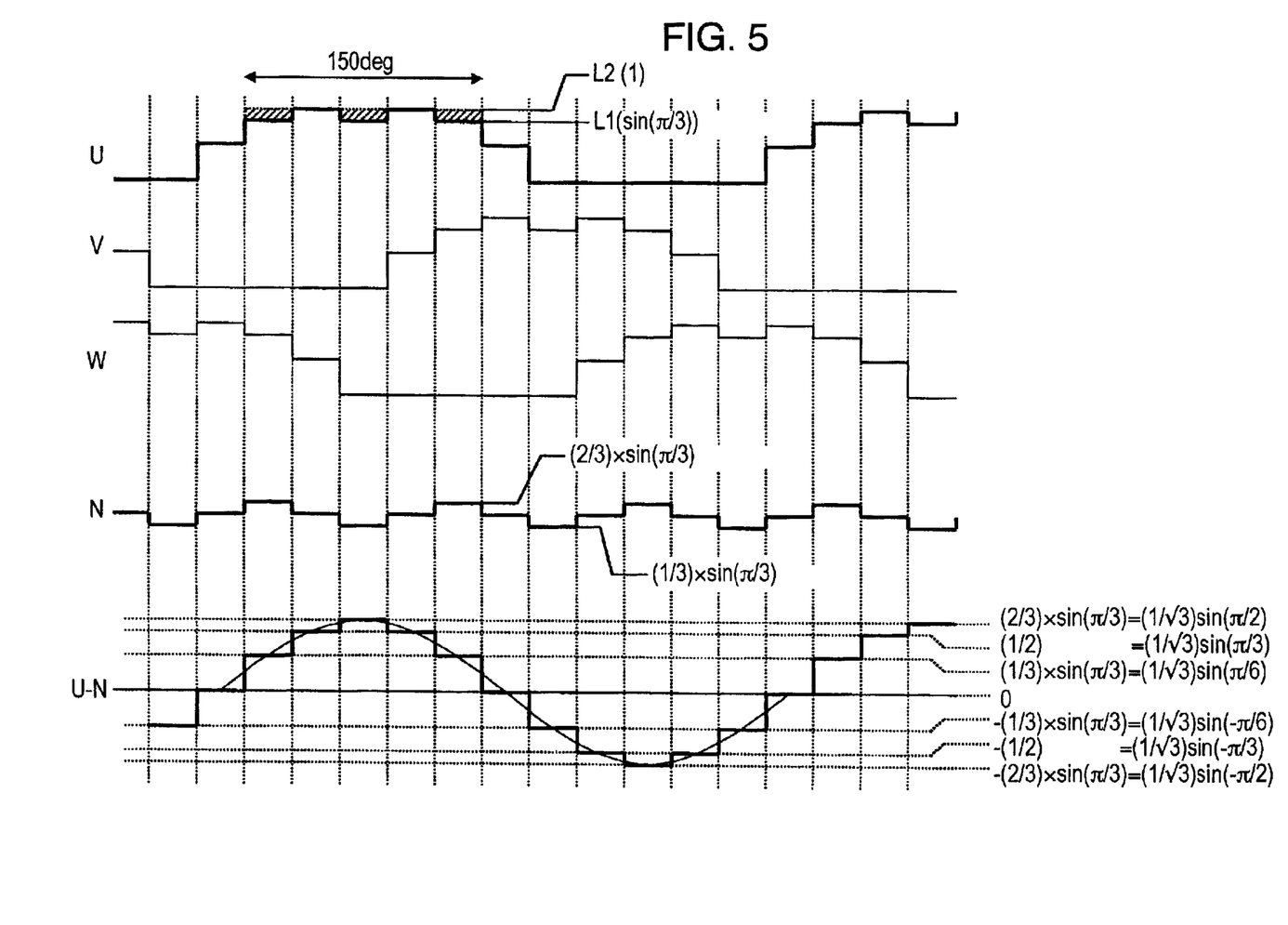
FIG. 5 shows feeding waveforms at the respective phase-coils in the motor driving device shown in FIG. 1.

When coil terminals U, V and W are driven with such feeding waveforms, waveform (N) shown in FIG. 5 appears at neutral point N of respective phase-coils 11, 13 and 15. At this time, these respective phase-coils are fed according to voltage differences between neutral point N and respective coil terminals U, V and W. For instance, phase-U coil 11 is fed according to the waveform of signal U-N shown in FIG. 5.

This signal U-N takes the following values step by step, and these values are approximations and along a sine wave signal $\{(1/\sqrt{3}) \sin \theta\}$, where $\theta = n\pi/6$, n=an integer. These values are as follows:

"−(2/3) sin (π/3)", "−(1/2)", "−(1/3) sin (π/3)", "0 (no feeding)", "(1/3) sin (π/3)", "(1/2)", and "(2/3) sin (π/3)".

The reason why signal U-N takes these values step by step along the sine wave signal is that the selection out of first value L1 and second value L2, of which ratio is set at "sin (π/3): 1", is switched by overlapping period detecting signal OL, thereby feeding power to the respective phase-coils.

The similar operations are provided to phase-V coil 13 and phase-W coil 15. Although they are not shown in the drawings, signals V-N and W-N take values along sine wave signals and shape in step-like waveforms. When each phase coil is driven by such feeding waveforms, torque ripples can be restrained as low as equal to those of the driving by a sine wave.

Figure 6:
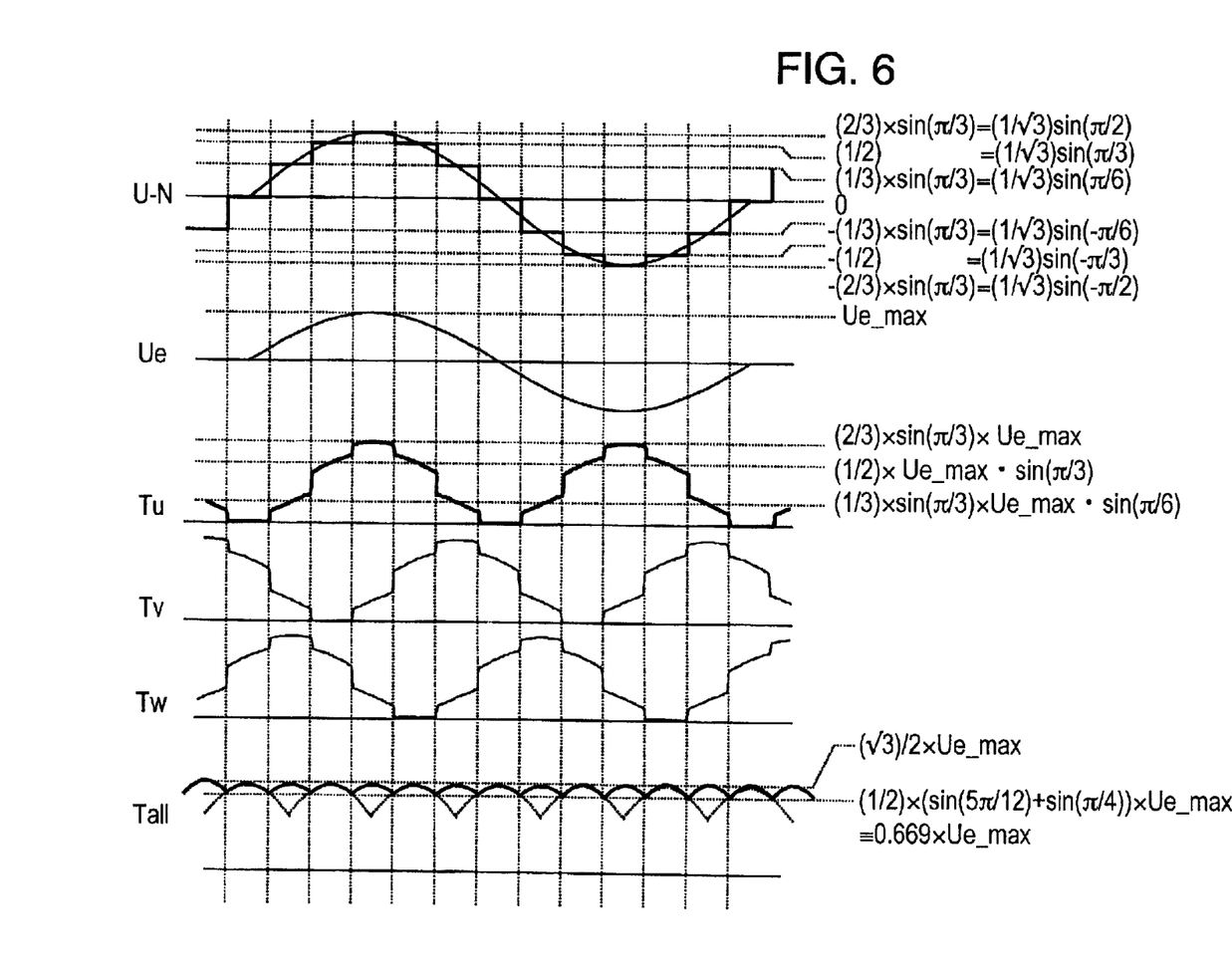
FIG. 6 illustrates how torque is produced in the motor driving device shown in FIG. 1.

FIG. 6 illustrates how torque is generated when a phase coil has back electromotive force shaping in a sine wave. For making the description simple, FIG. 6 shows only waveform Ue of the back electromotive force of phase-U. In FIG. 6, torque Tu, Tv and Tw are generated by phase-U coil 11, phase-V coil 13 and phase-W 15 coil respectively. For instance, torque Tu corresponds to a product of an instantaneous value of back electromotive force waveform Ue and that of signal U-N. All torque Tu, Tv and Tw are compounded to be total output torque of the motor. This total torque is shown by torque "Tall" (solid line) in FIG. 6.

The dotted line is overlaid on torque "Tall" in FIG. 6 for a comparison purpose, and it shows the torque produced by a conventional motor driving device shown in FIG. 11. This comparison proves that the motor driving device of the present invention generates substantially smaller torque ripples during the operation and the torque ripples are less than a half of the conventional ones. At the same time, an average value of the torque is improved.

As discussed above, the first embodiment features the following structures:

(1) Respective phase-coils 11, 13 and 15 are fed by wide-angle feeding device 1 in a width of 150 degrees in electrical angles.

(2) An amount of feeding power during the overlapping periods, in which adjacent two coils are fed in the same condition, is set at first value L1, and that of non-overlapping periods is set at second value L2 by feeding amount controller 2.

(3) A ratio of first and second values L1 and L2 is set at sin(π/3): 1. These features of (1) through (3) allow torque ripples to decrease substantially, and at the same time, an average of torque generated can be improved.

Various signals in the first embodiment can be processed by hardware such as analog circuits or digital circuits, or by software using microprocessors or digital signal processors (DSP). Not to mention, signal-processing can be integrated into ICs or LSIs.

In the first embodiment, an amount of feeding power to each transistor, constituting feeder 20, is controlled with PWM modulation, i.e., ON-OFF is switched based on a desired duty cycle. However, another control method is available, for instance, bipolar transistors are used as the transistors constituting feeder 20, and activities of the bipolar transistors are controlled. In other words, a voltage between collector and emitter is controlled.

Motor 10 is not necessarily a brushless DC motor, and it can be an induction motor, reluctance motor or stepping motor as long as it has three-phase coils.

Second Exemplary Embodiment

Figure 7:
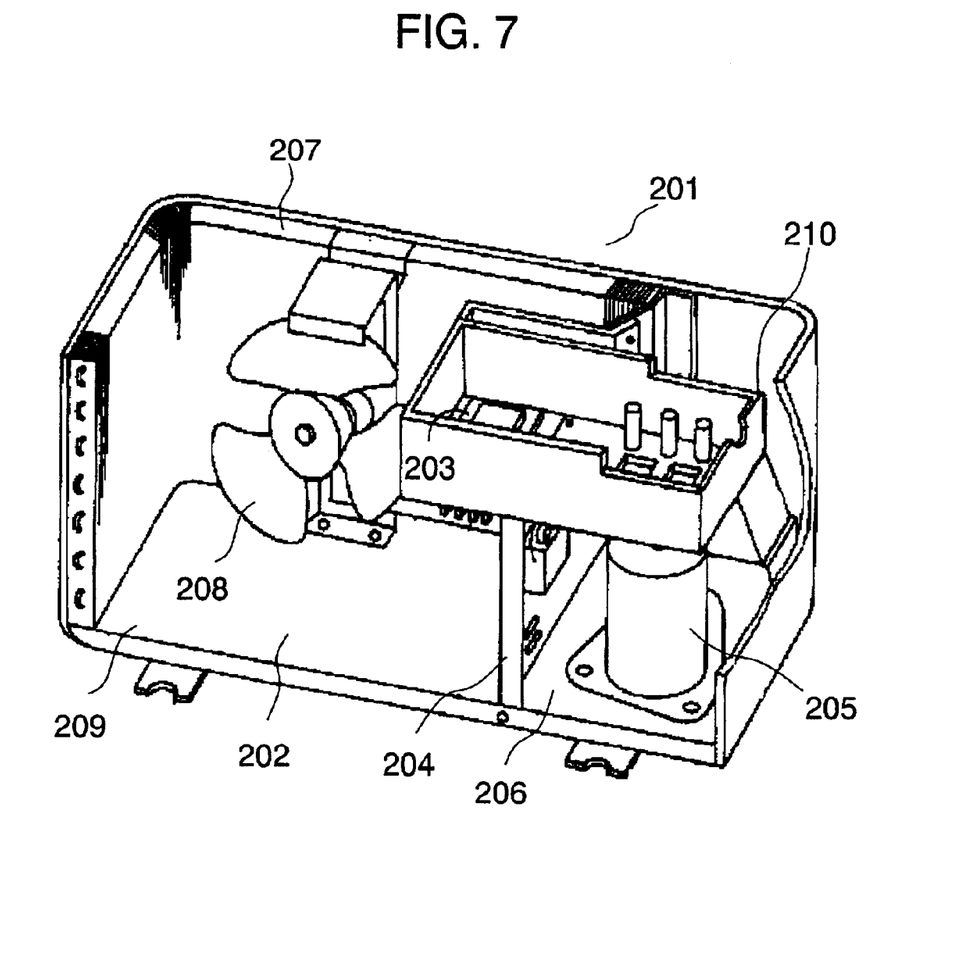
FIG. 7 describes a structure of an air conditioner in accordance with a second exemplary embodiment of the present invention.

FIG. 7 shows a structure of an air conditioner in accordance with the second embodiment of the present invention. More particularly, it shows a structure of an outdoor unit of an air conditioner employing the motor driving device of the present invention in a fan motor of a blower.

In FIG. 7, outdoor unit 201 is divided into compressor room 206 and heat exchanger room 209 by partition 204 disposed on bottom plate 202. In compressor room 206, compressor 205 is placed, and in heat exchanger room 209, heat exchanger 207 and blowing fan motor 208 for cooling heat exchanger 207 are placed. On partition 204, box 210 containing electronic devices is placed.

Fan motor 208 is formed of a blowing fan mounted to a rotary shaft of a brushless DC motor, and driven by motor driver 203 accommodated in box 210. Driving fan motor 208 entails the blowing fan to spin for cooling heat exchanger room 209.

The motor driving device includes fan motor 208 and motor driver 203. What is demonstrated in the first embodiment can be used as this motor driving device. Feeding power to motor coils can be approximated to a sine wave, so that the motor can be driven at low torque ripples, and at the same time, an average of torque generated can be improved. As such, when the motor driving device of the present invention is employed in a fan motor, an apparatus, to which the fan motor is mounted, can be operated with lower noises, less vibrations and at higher efficiency. Several preferred examples of employing the motor driving device of the present invention to apparatuses are demonstrated hereinafter.

First, the motor driving device is suitable for not only the outdoor unit but also an indoor unit of the air conditioner. It allows the indoor unit to operate substantially calm and with less vibrations.

Second, the present invention is suitable for an air cleaner. The motor driving device of the present invention allows the air cleaner to operate substantially calm and with less vibrations, so that the air cleaner can be advantageously used in a bedroom.

Further, the present invention is suitable for hot-water supplying apparatuses such as a gas hot-water supply or an oil hot-water supply. A hot-water supply, of which burning fan uses this device, operates substantially calm with less vibrations and at higher efficiency.

Third Exemplary Embodiment

Figure 8:
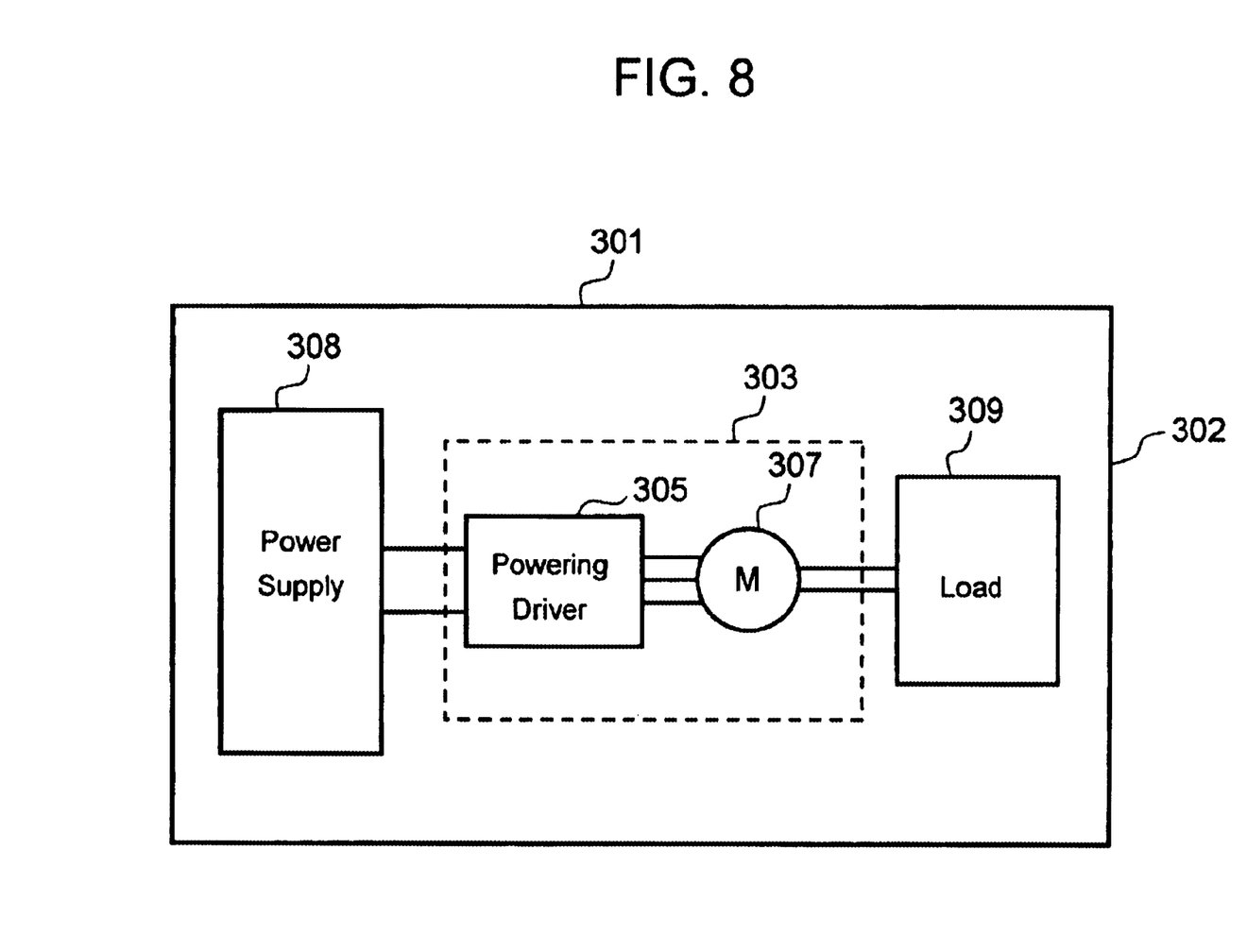
FIG. 8 is a schematic diagram of an apparatus in accordance with a third exemplary embodiment of the present invention.

FIG. 8 is a schematic diagram illustrating an apparatus in accordance with the third embodiment of the present invention. In FIG. 8, apparatus 301 comprises housing 302, motor 307 mounted to housing 302, motor driver 305 for driving motor 307, power supply 308 for powering driver 305, and load 309, e.g., some mechanism, to be driven by motor 307 as a power source. Motor 307 and driver 305 constitute motor driving device 303. In apparatus 301 of the third embodiment, motor 307 is driven by power supply 307 via driver 305. Motor 307 produces rotating torque and transfers the torque to load 309 via its output shaft.

The motor driving device demonstrated in the first embodiment is used as motor driving device 303. In actual, apparatus 301 can be a copying machine, printer, optical medium apparatus and hard-disc apparatus.

In the case of the copying machine, the motor driving device of the present invention can be applied to, e.g., a drum motor for rotating a photo conductor drum. The motor driving device allows the copying machine to operate with less vibrations as well as lower noises and produce a higher resolution copy.

In the case of a laser beam printer, the motor driving device can be applied to, e.g., a polygon mirror scanner motor for scanning laser. The motor driving device allows the printer to operate with less vibrations as well as lower noises and produce a higher resolution print.

In the case of the optical medium apparatus, the motor driving device can be applied to, e.g., a spindle motor for spinning CD-ROM disc, DVD, optical disc, mini disc and the like. The motor driving device allows the optical medium apparatus to operate with less vibrations as well as lower noises and read/write data more accurately.

In the case of the hard disc apparatus, the motor driving device can be applied to, e.g., a spindle motor for spinning a hard disc. The motor driving device allows the hard disc apparatus to operate with less vibrations as well as lower noises and read/write data in a higher density.

As discussed above, according to the present invention, feeding power to three-phase coils is approximated to a sine wave, so that a motor can be driven with lower torque ripples, actually, the torque ripples become less than a half of conventional ones. At the same time, an average of torque generated can be improved. In other words, a motor driving device in a rather simple construction can advantageously generate less vibrations, lower noises, and yet, higher output and operate at higher efficiency.

This motor driving device can lower resonance sound between an apparatus, to which the motor is mounted, and the motor per se. Less vibrations means less unevenness in rotations. Thus more accurate control can be realized, which improves performances of the various apparatuses.

What is claimed is:

1. A motor driving device comprising:
   a motor including three-phase coils;
   a wide-angle feeding device for feeding power to the coils in a width of 150 degrees in electrical angles; and
   a feeding amount controller for controlling an amount of feeding power to the coils by the wide-angle feeding device,
   wherein the wide-angle feeding device detects an overlapping period in which adjacent coils out of the phase-coils are in an identical fed condition,
   wherein the feeding amount controller controls such that a first value is fed to the coils during the overlapping periods and a second value is fed during periods other than the overlapping periods.

2. The motor driving device of claim 1, wherein a ratio of the first value vs. the second value is set at $\sin(n/3): 1$;

3. The motor driving device of claim 1, wherein the motor is a brushless DC motor.

4. The motor driving device of claim 1, wherein the motor is an induction motor.

5. The motor driving device of claim 1, wherein the motor is a reluctance motor.

6. The motor driving device of claim 1, wherein the motor is a stepping motor.

7. A motor driving device for a motor having multi-phase coils, said driving device comprising:
   apparatus for transmitting multi-phase power, wherein power transmitted to each of said phase coils is transmitted for respectively equal periods, and for
   detecting when portions of the respectively equal periods of power transmitted to adjacent phase coils overlap; and
   a controller for transmitting a first amount of power during the overlapping portions of power and for transmitting a second amount of power when the respectively equal periods of power do not overlap.

* * * * *